United States Patent [19]

Billigmeier

[11] 4,142,545
[45] Mar. 6, 1979

[54] LIQUID PESTICIDE METERING, TRANSFERRING AND RINSING APPARATUS

[76] Inventor: James M. Billigmeier, 19021 E. Main St., Linden, Calif. 95236

[21] Appl. No.: 847,166

[22] Filed: Oct. 31, 1977

[51] Int. Cl.² ............................................. B05C 7/00
[52] U.S. Cl. .................................. 137/240; 137/575; 137/588
[58] Field of Search ............... 137/588, 205, 575, 565, 137/240; 141/290, 90

[56] References Cited

U.S. PATENT DOCUMENTS

| | | | |
|---|---|---|---|
| 3,908,718 | 9/1975 | Bower | 137/588 |
| 3,976,087 | 8/1976 | Bolton | 137/205 X |
| 4,009,739 | 3/1977 | Weatherford | 141/90 X |

Primary Examiner—Alan Cohan
Attorney, Agent, or Firm—Lothrop & West

[57] ABSTRACT

A closed liquid pesticide metering and mixing system is provided which meets or exceeds any presently known governmental safety criteria for removing liquid pesticide concentrate from the original shipping container and transferring the concentrate to a mix or application vehicle tank. The present system not only eliminates open pouring but also provides measurement and transfer of the concentrate as well as rinsing of the emptied containers.

4 Claims, 5 Drawing Figures

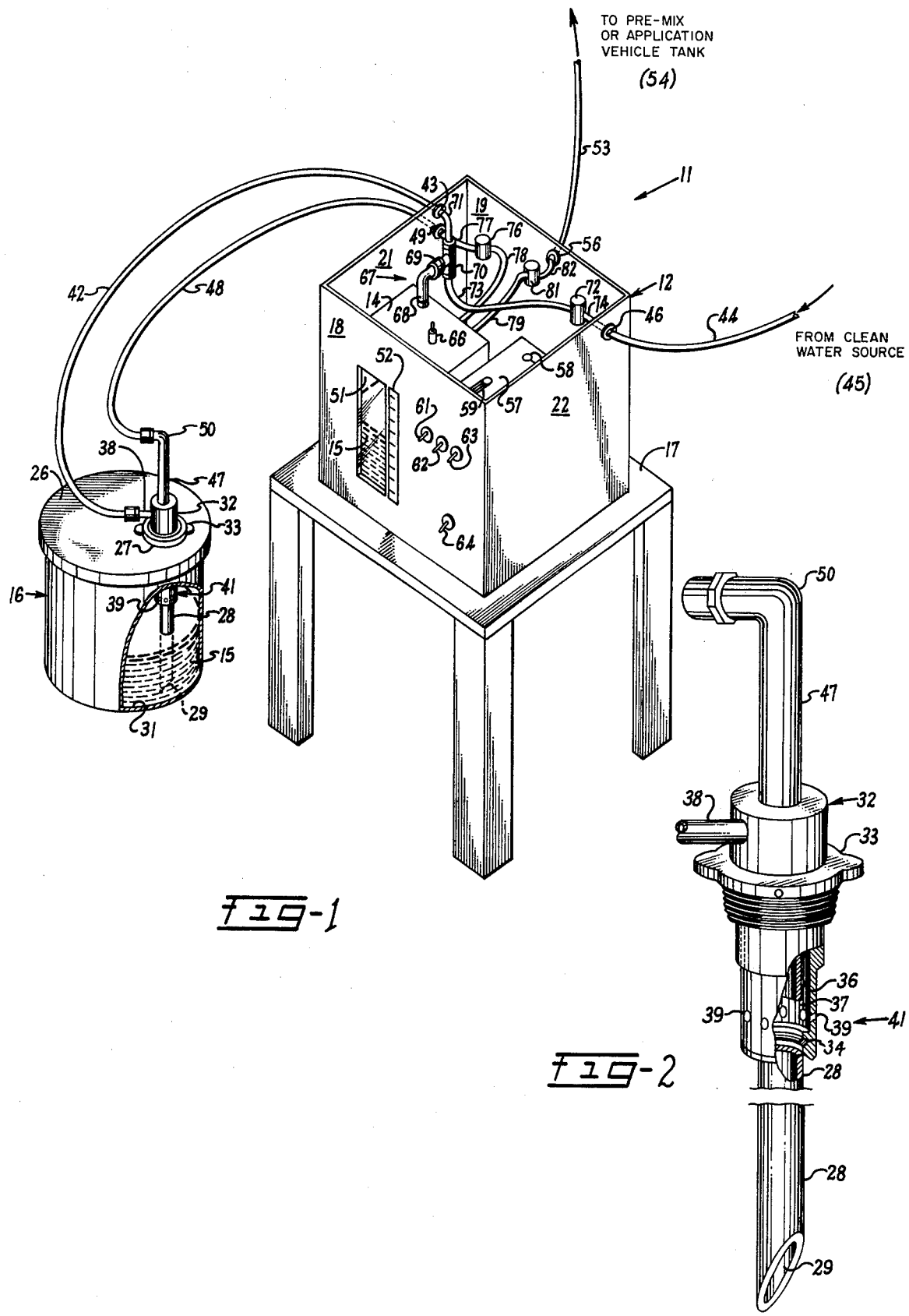

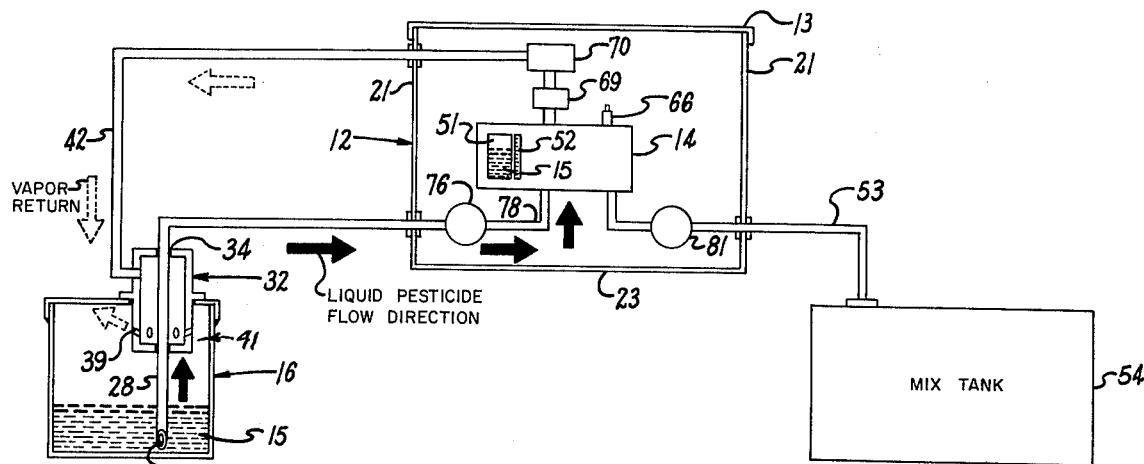
FIG-3 (METERING CYCLE)
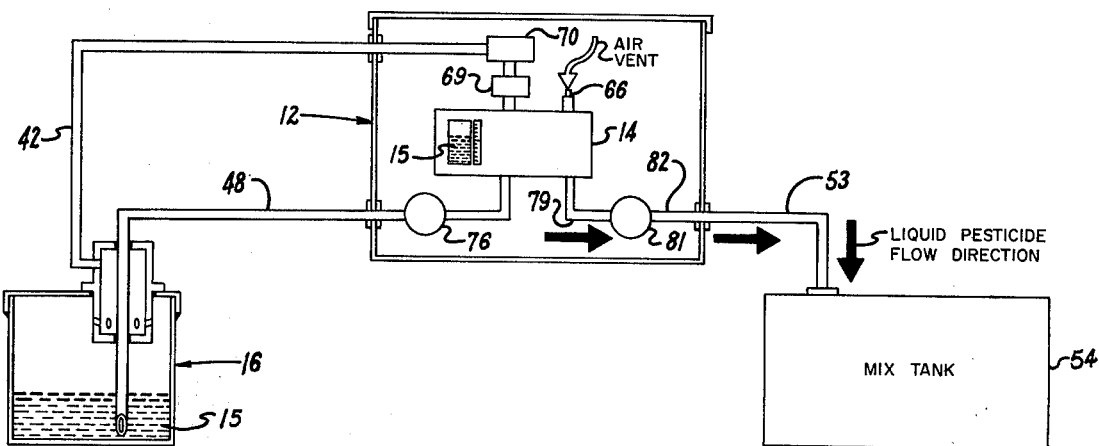
FIG-4 (TRANSFER CYCLE)
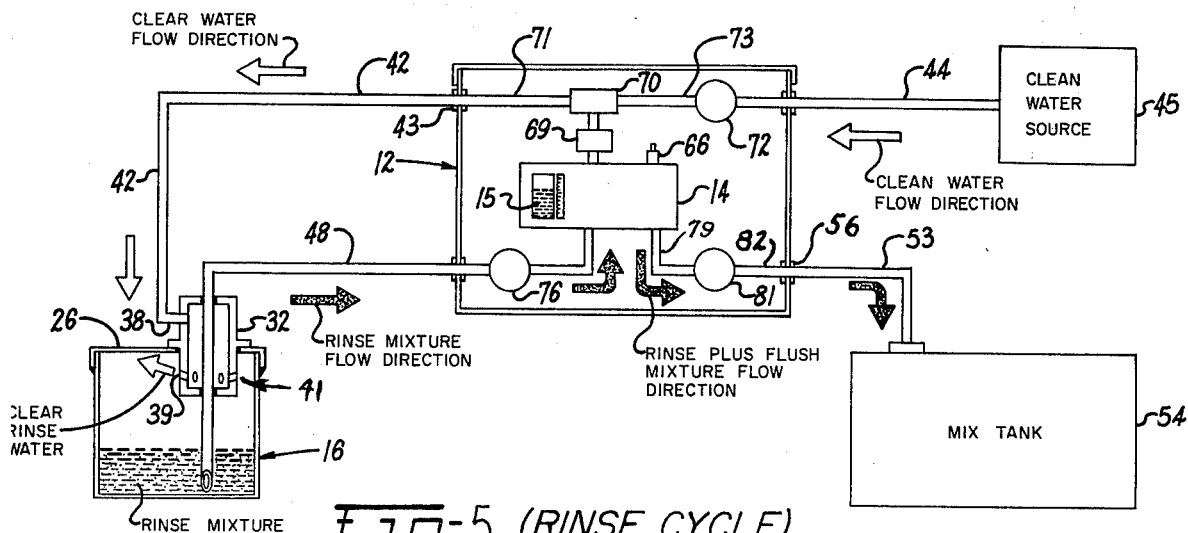
FIG-5 (RINSE CYCLE)

LIQUID PESTICIDE METERING, TRANSFERRING AND RINSING APPARATUS

BACKGROUND OF THE INVENTION

The market place as well as the patent literature are not without representative systems for the handling of toxic fluids such as liquid pesticides widely used, for example, in the field of agriculture in the form of a spray to combat insects, plant diseases and the like.

Exemplary of disclosures in the patent literature are U.S. Pat. Nos. 3,913,606, 3,916,924, 3,976,087 and 3,993,221.

There remains, however, considerable room for improvement, particularly in view of recent more stringent governmental regulations requiring a closed system of handling liquids possessing a high level of toxicity, such as category one pesticides which display the signal word DANGER on the label and are considered the most toxic and hazardous, and category two pesticides which are considered moderately toxic and display the signal word WARNING on the label.

SUMMARY OF THE INVENTION

The invention relates to improvements in fluid transfer devices capable of metering and handling toxic liquids and vapors in a totally closed system.

It is an object of the invention to provide a fluid handling system which eliminates the need for pouring toxic liquids by hand.

It is another object of the invention to provide a fluid handling system which is safe and easy to operate and which meets or exceeds any presently known environmental standards.

It is still another object of the invention to provide a fluid handling system which eliminates the necessity of venting to the atmosphere as toxic liquid is moved from one container to another, thereby adding to the over-all safety of pesticide users.

It is yet another object of the invention to provide a fluid handling system which is efficient, fast, accurate in metering and is long lasting if properly serviced and maintained.

It is a further object of the invention to provide a generally improved liquid pesticide metering, transferring and rinsing system.

Other objects, together with the foregoing, are attained in the embodiment shown in the accompanying drawing.

BRIEF DESCRIPTION OF THE DRAWING

FIG. 1 is an isometric view of one embodiment of the fluid handling apparatus of the invention including a housing (with the lid removed) having connections to a source of clean water, a conduit extending to a mixing tank and a pair of hoses extending to a liquid pesticide shipping container from which liquid is withdrawn in measured quantities and which is subsequently rinsed with clean water;

FIG. 2 is a fragmentary isometric view, to an enlarged scale, of the sealing plug, suction tube and rinse jet with portions broken away to disclose interior details;

FIG. 3 is a schematic view illustrating the metering cycle;

FIG. 4 is a schematic view illustrating the liquid transfer cycle; and,

FIG. 5 is a schematic view illustrating the rinsing cycle.

DETAILED DESCRIPTION OF PREFERRED EMBODIMENT

While the fluid handling system of the present invention is susceptible of numerous physical embodiments, depending upon the environment and requirements of use, substantial numbers of the herein shown and described embodiment have been made, sold and used, and all have performed in an eminently satisfactory manner.

The fluid handling system of the invention, generally designated by the reference numeral 11, comprises a box-like sheet-metal housing 12 and a removable lid 13 (see FIG. 3).

The housing 12 contains a closed metering vessel 14 to receive the liquid pesticide concentrate 15 from an original shipping container 16, such as a one, or five, gallon container or a thirty, or fifty-five, gallon shipping drum.

In order to prevent any unwanted siphoning effect, the shipping container 16 is, during operation of the apparatus, located at an elevation lower than that of the housing 12; thus the showing of a table 17, or bench, supporting the housing 12 at a height well above that of the container 16 located on the ground, or floor. For optimum efficiency and greatest accuracy, the housing 12 should be level while the device is in operation. Leveling can readily be effected by use of a spirit level and suitable leveling blocks inserted between the bottom of the housing 12 and the supporting surface of the table 17.

The box-like housing 12 includes a front wall 18, rear wall 19, left side wall 21 and right side wall 22, as appears in FIG. 1, as well as a bottom wall 23 and top lid 13, as shown in FIG. 3, for example.

Pursuant to the invention, a predetermined quantity of the liquid pesticide concentrate 15 in the shipping container 16 can be withdrawn without the necessity of hand pouring and in such a manner that any toxic liquid or vapor is entirely enclosed within the system.

The shipping container 16 is received with an airtight cover 26 having an opening 27 therein, the opening 27 being sealed or plugged until withdrawal of the liquid is to be commenced.

When fluid is to be withdrawn, the seal or plug covering the opening 27 is removed and in the opening 27 is inserted an elongated probe 28, or suction tube, beveled at the lower end 29 so that when the tip of the probe touches the bottom 31 of the container the probe's opening is not in engagement with the bottom 31 and thus cannot be blocked shut thereby.

In order to help provide a tight seal so that liquid or vapor does not escape through the opening 27, an accurately dimensioned, stepped, hollow, cylindrical plastic plug 32 is provided.

Snugly and rotably disposed on the plug 32 is a bung adapter 33 threaded for engagement with the opening in thirty or fifty-five gallon drums, where such larger containers, or drums, are being used. A long probe 28, or suction tube, is required if a large container or drum is to be emptied.

For smaller containers, such as one or five gallon sizes, the appropriate step of the plug 32 is pressed into firm sealing engagement with the walls of the opening 27 during emptying of the container and subsequent rinsing thereof. A short probe 28 can be used where the containers are small.

The probe tube 28 extends coaxially through the plug 32, sealing between the tube 28 and the body of the plug 32 being effected by a pair of vertically spaced O-rings 34 at the upper and lower ends of the hollow chamber 36 within the plug. Since the diameter of the probe tube 28 is less than that of the walls of the plug chamber 36, an annular space 37 is provided into which clean water can be introduced through a fitting 38. Located near the bottom of the annular space 37 is a plurality of apertures 39 leading upwardly and outwardly through the plug walls and spaced peripherally around the bottom of the plug to form a 360 degree nozzle 41 capable of emitting numerous upwardly and outwardly directed jets of high speed clean water during the rinse cycle.

The fitting 38 is connected to a flexible hose 42 extending to a fitting 43 on the housing wall 21 and is in communication (through intermediate pump, valve and conduit members, as will later be described) with a clean water supply hose 44 leading from a suitable clean water source 45 (see FIG. 5) to a fitting 46 on the housing wall 22.

During the metering cycle, the liquid pesticide concentrate 15 passes through the opening in the beveled lower end 29 of the probe 28, upwardly through a suction tube 47 thence through an ell 50 to a flexible hose 48 connected to a fitting 49 on the housing wall 21.

From the fitting 49, the liquid flows through intermediate valve, pump and conduit members, as will subsequently be described, and emerges into the bottom of the metering vessel 14.

The front wall 18 of the housing serves also as the front wall of the vessel 14, the front edges of the side, bottom and top walls of the vessel being sealingly mounted on the inside of the front wall 18 of the housing 12.

As most clearly appears in FIG. 1, a portion of the front wall 18 of the housing 12 is replaced by a transparent panel 51 of tough plastic material to afford a sight glass showing the level of the liquid 15 being metered in the vessel 14. A suitably marked and calibrated liquid quantity scale 52 in close juxtaposition to the sight glass 51 enables the user accurately to withdraw the precise amount desired from the container 16 and make such measured quantity available for subsequent transfer, as needed, through a flexible hose 53 to a water and pesticide pre-mix or application vehicle tank 54, as appears in FIG. 3, for example.

The liquid 15 in the metering vessel 14 is in communication with a fitting 56 on the back wall 19 and with the transfer hose 53, through intervening valve, pump and conduit members, as will shortly be described.

In the form of device shown in FIG. 1, power is conveniently provided by a rechargeable 12-volt battery 57 having a ground terminal 58 and a conductor terminal 59 connected to the various metering, transfer and rinsing units controlled, respectively, by a meter switch 61, a transfer switch 62 and a rinse switch 63 located on the front wall 18 of the housing 12.

In larger, multi-system units it is often desirable to use an internal combustion engine-generator electrical set rather than a battery as a power source.

Also located on the front wall 18 but separated somewhat from the switches 61, 62 and 63, is a meter pump reversing switch 64 enabling the user to reverse the meter pump and return some of the liquid 15 from the metering vessel 14 through the suction probe 28 to the container 16 in the event an excessive quantity of liquid is inadvertently allowed to flow into the vessel 14, as will subsequently described in more detail.

It is to be noted, at this juncture, that a first check valve 66 on top of the vessel 14 vents atmospheric air into the vessel to normalize the pressure when fluid is removed from the vessel, such as during transfer of fluid from the vessel to the pre-mix or application vehicle tank. However, when the metering vessel 14 is being filled with pesticide, the check valve 66 closes, thereby obviating the escape of toxic liquid or vapor into the atmosphere.

Still further safety measures are taken to avoid a build-up of unwanted liquid or vapor pressures in the metering vessel 14. Such measures include the provision of a safety overflow system, generally designated by the reference numeral 67, comprising a fitting 68 connected to the metering vessel 14, the fitting 68 including a check valve 69 which opens under a pressure increase caused by an overfill of liquid in the metering vessel 14. Excess fluid is thereby allowed to flow through the check valve 69 into a tee fitting 70, and connecting hose 71 thence through fitting 43 and hose 42 to the fitting 38 where the surplus fluid passes through the annular chamber 37 in the plug 32 and out the jets of the nozzle 41 into the container 16.

When flow into the vessel 14 is stopped and the pressure in the safety overflow system 67 is equalized, the check valve 69 closes.

In other words, should the meter switch 61 be inadvertently left engaged to where the metering vessel 14 would become overfilled, the slight amount of pressure caused by the overfilling would cause the safety check valve 69 to open, permitting the liquid pesticide in the chamber 14 to flow back to the shipping container 16.

Thus, the overflow system 67, being a closed system, safely and effectively returns surplus pesticide to the shipping container, and not only eliminates unsafe pressure build-up in the vessel but also any chance of an improperly measured amount of toxic pesticide entering the pre-mix or application vehicle tank.

This safety return flow continues until the operator disengages the meter switch 61 or, if necessary, engages the pump-motor reversing switch 64 to pump excess fluid out of the vessel 14 and back through the hose 48 and the probe tube 28 into the container 16 until the desired amount of pesticide remains in the vessel, as indicated by the calibrated scale 52 next to the sight glass 51. The proper amount of pesticide can then be transferred to the pre-mix or application vehicle tank, as will later be described.

The safety check valve 69 also provides an important venting function made necessary by the fact that when the suction probe plug 32 is inserted in the opening 27 in the shipping container 16, an air tight seal is formed. Thus, when fluid is withdrawn from the container 16 through the suction line 48 into the metering vessel 14, not only is the pressure of the vapor increased within the vessel 14, but a "vacuum" is formed within the shipping container 16. The pressure differential causes the check valve 69 to open; and since the check valve 69 is located on the top of the metering vessel 14, the slightly pressurized vapor flows out through the check valve 69 and into the hose 42, emerging through the jet orifices in the nozzle 41 into the shipping container 16 to replace the volume occupied by the liquid being withdrawn. The air within the empty metering vessel 14 is thereby transferred to the container, eliminating any "vacuum" in the shipping container 16 and equalizing pressures in the closed system.

The check valve 69 serves still another function, namely, to stop the flow into the metering vessel 14 of clean rinse water emerging from the rinse water booster pump 72 and hose 73 connected to the tee fitting 70 attached to the check valve 69. The booster pump 72 is preferably of the combination pump-motor type encased within a single housing.

As shown most clearly in FIG. 1, the booster pump 72 increases the pressure of the clean rinse water flowing from the clean water source 45 through the hose 44, the fitting 46 and the connecting conduit 74. As a result of the booster pump 72, the clean rinse water is sprayed from the nozzle 41 into the interior of the shipping container 16 at a very high velocity during the rinse cycle, thereby assuring that all residual pesticide on the side walls and cover of the shipping container is dislodged and flushed away. The rinse water from the source 45 should be substantially free of any abrasive particles in order to minimize wear throughout the system, particularly the pumps.

Although not shown in detail in FIG. 1, the rinse water booster pump 72 is actuated by suitable conventional electrical wiring forming circuitry including the battery 57, as a power source, and the rinse switch 63. When the rinse switch 63 is engaged, the booster pump 72 is placed in operation and the rinse cycle is commenced.

In like fashion, the metering cycle is controlled by the meter switch 61 connected electrically both to the battery 57 and a metering pump 76, or pump-motor, the flow of pesticide liquid from the container 16 passing from the probe 28 through suction line 48, fitting 49, hose 77, pump 76 and hose 78 into the bottom of the metering vessel 14.

Another fitting in the bottom of the metering vessel 14 is connected to a hose 79 leading to a transfer pump 81, or pump-motor, and hose 82 connecting to the fitting 56, thence through transfer hose 53 to the pre-mix or application vehicle tank 54. Control of the transfer circuit resides in the transfer switch 63, connected in series to the battery 57 and the transfer pump 81, in a manner comparable to the wiring of the meter switch 61 and the rinse switch 63.

OPERATION

With the probe in position, as shown most clearly in FIG. 1, the metering cycle is started by engaging the toggle or lever actuated meter switch 61. This turns on the meter pump 76, thereby applying a suction through the hose 48 and the suction probe 28, and withdrawing liquid pesticide 15 from the container 16. The pesticide flows through the metering pump 76 and the hose 78 into the bottom of the metering vessel 14, as appears most clearly in FIG. 3.

As flow continues, the level of the liquid pesticide 15 within the metering vessel 14 rises. When the liquid level as seen through the sight glass 51 reaches the desired quantity, as indicated by the calibrated scale 52, the metering switch 61 is manually disengaged by the operator, thereby stopping the metering pump 76 and halting the metering cycle.

During the metering cycle, some of the air initially in the metering vessel 14 flows out through the check valve 69 and through the hose 42, emerging from the nozzle 41 and normalizing the "vacuum" in the space above the falling level of pesticide. In this fashion, vapor pressures are equalized throughout the metering system.

Should the operator inadvertently fail to disengage the metering pump switch 61 at the appropriate juncture, the metering pump reverse switch 64 can be turned on so as to withdraw liquid pesticide from the metering vessel 14 until the proper fluid level is reached, the reverse switch 64 then being disengaged.

So also, as previously explained, should the metering switch 61 be allowed to remain engaged overly long so that all of the air above the liquid in the vessel 14 has been expelled into the shipping container 16, any slight pressure increase caused by the further introduction of pesticide into the vessel 14 is immediately relieved as excess fluid is returned to the shipping container 16 by way of the check valve 69, hose 42 and nozzle 41. Then, as soon as the operator discovers the oversight and disengages the metering switch 61, the reversing switch 64 can be actuated and the pump 76 will remove surplus fluid, returning it to the shipping container through hose 48 and probe tube 28. During the time that the surplus liquid is being pumped back to the shipping container, check valve 66 opens, if necessary, to vent atmospheric air into the space above the liquid level within the metering vessel to normalize the vapor pressure in the vessel.

With the desired amount of liquid pesticide in the metering vessel, the metering pump 76 is switched off and the transfer cycle can be immediately commenced, flow taking place as illustrated in FIG. 4. This cycle is initiated by flipping the lever of the transfer switch 62 into engaged mode. Liquid 15 is withdrawn from the metering vessel 14 by the transfer pump 81, flow taking place from the bottom of the vessel 14 through conduit 79, pump 81, conduit 82, fitting 56 and through the flexible hose 53 to a pre-mix or application vehicle tank 54.

It should be noted at this point that in most, if not all, cases, the liquid-pesticide concentrate 15 is mixed with water prior to application, the ratio of the pesticide to water mixture being carefully determined for optimum effect.

In some instances, mixing is effected in a tank, often called a pre-mix tank, the mixture later being transferred to the tank carried on a spray rig vehicle which traverses the orchard or row crop plants being sprayed. In the case of aereal application, the spray mixture is carried in special tanks mounted on an airplane.

In other cases, mixing is done directly in the tanks of the application vehicle, or spray rig.

When the metered quantity of pesticide in the metering vessel 14 has been totally discharged and transferred to the tank 54, the transfer switch 62 is manually disengaged, thus terminating the transfer cycle.

As previously indicated, during the transfer cycle, as fluid is withdrawn from the metering vessel 14 by the transfer pump 81, the tendency of a "vacuum" to form in the vessel 14 is obviated by the opening of the check valve 66, permitting atmospheric air to be vented into the vessel. When fluid withdrawal is terminated, check valve 66 closes, thereby preventing the issuance into the atmosphere of any toxic liquid or vapor.

Eventually, the supply of liquid pesticide concentrate 15 within the shipping container 16 is exhausted and the container must then, by law, be thoroughly rinsed and the apparatus 11 flushed.

In some circumstances, flushing will be undertaken prior to rinsing the container, for example, where it is desired to commence the use of another kind of pesticide while wishing to save the remaining quantity of the first pesticide in the shipping container for subsequent use.

If the supply of liquid concentrate in the shipping container is exhausted and rinsing and flushing are both to be effected, not only the rinsing switch 63 but also the metering switch 61 and the transfer switch 62 are moved to engaged position.

This causes all three pumps 72, 76 and 81 to begin operating.

As clearly appears in FIG. 5, the clean water booster pump 72 forces clean water under high pressure to flow through the conduit 73, tee fitting 70, conduit 71, fitting 43, hose 42, fitting 38, plug 32 and to emerge from the 360° nozzle orifices 39 in upward and outwardly directed jets which impinge against the lower surface of the cover 26 and the inner wall surfaces of the container 16 with high velocity.

The high pressure jets of clean water strike and restrike the inner surfaces vigorously and dislodge any and all films or drops of pesticide concentrate, thereby quickly diluting the relatively small quantity of pesticide left in the shipping container.

Concurrently, the metering pump 76 withdraws the pesticide plus clean rinse water mixture, which very soon becomes weak and diluted as the interior of the shipping container is washed clean. The weakening mixture is pumped to the metering vessel 14 and serves to flush and clean the intervening hoses and pump 76 as well as the interior of the vessel 14.

At the same time, the transfer pump 81 sucks the flushing water and weak pesticide mixture from the metering vessel 14 into the mix tank 54, the transfer pump 81 and intermediate conduits being simultaneously flushed clean.

In a relatively short time, and with the use of but a relatively small amount of clean rinse water, the container is thoroughly rinsed and the various systems are thoroughly flushed. The switches 61, 62 and 63 can then be disengaged and the shipping container disconnected from the plug 32.

It is to be noted that in the unlikely event that more of the water-pesticide mixture is pumped into the metering vessel by the pump 76 than is removed by the pump 81 during the rinsing-flushing cycle, any surplus mixture would flow out through the check valve 69 and join the clean rinse water at the tee fitting 70, thereby relieving any possible unsafe pressure build-up in the vessel 14.

Under current regulations, rinsing is continued until a minimum of one-half of the shipping container volume (or ten gallons, whichever is less) of clean water or rinsing solution has been used.

The metering and mixing system including the probes must be flushed with a neutralizing solution, such as NUTRA-SOL, or the like, each time a different liquid pesticide concentrate is to be metered and mixed, and at the end of each days use.

When it is desired to flush the metering and mixing system including the probes as, for example when a different pesticide is to be used, or at the end of the day, and the shipping container still contains some pesticide which can subsequently be used, the following steps are taken:

The bung adapter 33 is unscrewed or the stepped friction plug 32 is withdrawn from the opening 27 in the shipping container and the probe 28 is inserted into a container of NUTRA-SOL neutralizing compound.

The metering switch 61 is then engaged so as to pump the flushing compound into the metering vessel 14 until the vessel is ¾ full. The transfer switch 62 is thereupon engaged in order to transfer the flushing solution from the metering vessel into the tank 54. This procedure not only flushes the metering vessel 14 and probe 28 but also the two pumps 76 and 81 and connecting hoses and conduits.

In order to save time by eliminating the flushing and rinsing required when a different liquid pesticide is to be used, some operators prefer to use a larger apparatus wherein two or more units of the type shown in FIG. 1 are combined. In such cases, as previously indicated, power is conveniently provided by an electrical generator driven by an internal combustion engine integrally mounted on a frame, the frame supporting a box-like housing similar to but larger than the housing 12 shown in FIG. 1. Individual systems including metering vessels, hoses, pumps and controls are provided, each system being similar to the FIG. 1 form of device, so that different pesticides can be concurrently metered and transferred to individual tanks.

It can therefore be seen that a versatile, safe and efficient apparatus is provided for metering, transferring and rinsing of liquid pesticide concentrate.

What is claimed is:
1. A liquid pesticide handling apparatus comprising:
   a. a housing;
   b. a metering vessel mounted on said housing;
   c. a probe having an opening adjacent one end immersible in liquid pesticide in a shipping container;
   d. a first hose connecting the other end of said probe to said vessel;
   e. a metering pump interposed in said first hose capable of withdrawing the liquid from the shipping container and discharging the liquid into said vessel;
   f. means for measuring the quantity of the liquid in said vessel;
   g. check valve means for venting fluid from said vessel into the shipping container to replace the liquid withdrawn therefrom;
   h. means for transferring the measured liquid from said vessel to a mixing tank;
   i. means for rinsing the shipping container with a cleaning fluid, said rinsing means comprising hollow plug means sealingly engageable with the walls of an opening in the shipping container, said plug means including an upper end portion located outside the container and a lower end portion located inside the container, said lower end portion having a plurality of orifices forming a nozzle for the emission of high velocity cleaning fluid against the interior surfaces of the container; and,
   j. a tube capable of carrying cleaning fluid from a source to an opening in said upper end portion of said plug, said opening communicating with the hollow interior of said plug means and with said nozzle orifices.

2. An apparatus as in claim 1 in which said metering pump is controlled by switch means.

3. An apparatus as in claim 1 in which said probe sealingly extends through said upper and lower end portions of said plug means.

4. An apparatus as in claim 3 in which said plug means is a stepped hollow right circular cylinder and said probe extends coaxially therethrough.

* * * * *